Patented Feb. 13, 1951

2,541,886

UNITED STATES PATENT OFFICE 2,541,886

ALIPHATIC NITRO COMPOUNDS AS AZO COUPLING COMPONENTS

Fred W. Neumann, Nazareth, Pa., assignor to General Aniline & Film Corporation, New York, N. Y., a corporation of Delaware No Drawing. Application December 20, 1947, Serial No. 793,047

12 Claims. (Cl. 95—6)

This invention relates to photography. More particularly, the invention relates to the production of diazotype photoprints, and to materials and compositions therefor.

In diazotype photoprinting, a sensitized layer containing a light sensitive diazo compound is exposed to light of locally varied intensity in accordance with the design or pattern of an original to be copied, as by exposure under a photographic transparency or a line drawing. The diazo compound in the light struck portions of the layer is thereby decomposed or rendered incapable of forming color in a subsequent development treatment. Development is then effected by causing the residual diazo compound in the layer to couple with an azo coupling component, thus yielding a positive azo dye image of the original pattern or design.

In so-called two-component systems, an azo coupling component is incorporated together with the light sensitive diazo compound in the diazotype layer, the composition being stabilized against coupling prior to development. Development of such layers can be advantageously effected by a dry process, involving treatment of the layer with an alkaline vapor such as ammonia, thereby avoiding the necessity of moistening and drying the print. However, since stabilization of the composition against premature coupling is generally not completely effective, two-component diazotype layers usually have the disadvantage that they deteriorate at an appreciable rate in storage.

In one-component diazotype systems, the sensitized layers contain a light sensitive diazo compound without an azo coupling component, such layers being consequently characterized by greatly improved stability in storage. However, to develop one-component layers after exposure to light under an original pattern, it is customary to apply an azo coupling component in an aqueous developing solution, thus necessitating drying of the print with attendant difficulties in preventing distortion thereof and blurring of the image.

In diazotype photoprinting employing both of the aforesaid types of materials, the coupling components ordinarily employed are generally allowed to remain on the surface of the print, and generally tend to cause discoloration of the background areas, especially after alkaline development, upon prolonged exposure of the print to light and air. While such discoloration can be reduced by use of certain stabilizers, the means heretofore employed were not generally effective under all of the conditions to which prints are subjected. It has been proposed to develop one-component diazotype layers by exposing them to the action of vapors of volatile aromatic amines capable of coupling with the diazo compound to form a colored image. However, the aromatic amine couplers retained in the background areas likewise tend to cause discoloration when the print is exposed for prolonged periods to light and air.

It is an object of this invention to provide an improved method and improved compositions for development of one-component diazotype layers, and improved compositions for two-component diazotype layers, whereby the aforesaid disadvantages of the materials and processes heretofore used are largely eliminated. More specifically, it is an object of this invention to provide a new class of coupling components for application in making diazotype prints, and an improved technique for their application.

I have discovered that aliphatic nitro compounds having a nitro group attached to an aliphatic carbon atom carrying at least one active hydrogen atom (i. e., compounds containing an aliphatic radical having the formula $>CH—NO_2$ in at least one of its desmotropic forms) react with light sensitive diazo compounds in a diazotype layer after exposure thereof to light under an original, to yield an image of good color density and in a variety of shades. The coloration of the resulting image is stable, and the colorless background is likewise stable against discoloration.

An important advantage of the aforesaid class of coupling components lies in the fact that they include a number of volatile members (i. e., members having boiling points not greater than 152° C.), especially nitroparaffins of one to three carbon atoms (e. g., nitromethane, nitroethane, 1-nitropropane, and 2-nitropropane), which are eminently suitable for forming a diazotype image. In accordance with my invention, these compounds can be applied for development of one-component diazotype layers after exposure to light under an original, by subjecting the layer to the action of the vapors of a volatile aliphatic nitro compound as defined above together with the vapors of a volatile alkaline material, especially a volatile non-coupling basic nitrogen compound such as ammonia or a volatile aliphatic amine. Such use of the volatile aliphatic nitro compounds of my invention as coupling components thus permits dry development of one-component diazotype materials, while at the same time combining the convenience of such a development with greatly increased stability of the light sensitive layer in storage before use, as well as stability to discoloration of the prints or copies from exposure to light and air.

Non-volatile as well as volatile aliphatic nitro compounds of the type defined above can be applied for development of one-component diazotype materials in a wet or semi-wet development treatment involving application of said compounds in the form of an aqueous (generally alkaline) solution. Moreover, non-volatile aliphatic nitro compounds of the type defined above can be incorporated in two-component diazotype layers in the same manner as coupling components heretofore employed. Such two-component layers are suitable for development either by the dry process involving treatment with an alkaline vapor, or by a wet or semi-wet process generally involving application of an aqueous alkaline solution (e. g., an aqueous solution of ammonia, a water-soluble amine, or an inorganic alkaline material such as sodium carbonate) to the light-exposed diazotype layer.

Various materials can be used as bases or carriers for the light sensitive layer in preparing diazotype photoprinting material for use in accordance with my invention. Thus, the base or carrier can be paper, raw or gelatin coated, as well as films of plastic material such as cellulose acetate.

The diazo compounds employed in producing a sensitized layer for use in accordance with my invention are those ordinarily employed in diazotype compositions heretofore known. They comprise particularly p-aminophenyl diazo compounds which contain substituents such as alkyl or aryl groups on the undiazotized amino group.

In all cases the usual adjuvants can be included in the sensitizing composition and layers prepared therewith, as for example, humectants such as ethylene glycol; stabilizers such as citric or boric acid, or zinc chloride; anti-oxidants such as thiourea, and the like.

Volatile nitroparaffins suitable for use in the dry development of diazotype materials in accordance with this invention include nitromethane, nitroethane, 1-nitropropane and 2-nitropropane. Volatile alkaline reacting materials which can be used in conjunction with said coupling components include ammonia and non-coupling volatile nitrogen bases, such as primary, secondary, tertiary, acyclic, cyclic or heterocyclic amines and polyamines; for example, butylamine, aqueous solutions of monomethylamine, dimethylamine, ethylene diamine and morpholine.

Non-volatile nitro compounds suitable for inclusion in two-component systems or for the wet development of one-component systems include chain-substituted nitroparaffins containing, for example, as substituents, one or more hydroxyl groups, sulfonic acid groups, carboxylic acid groups, or functional derivatives of the latter such as esters or amides; e. g., 1-nitro-butanol-2, 2-nitro-butanol-1.

A convenient method for producing vapors employed for dry development of a one-component diazotype layer in accordance with this invention involves heating a mixture of the volatile alkaline material with a volatile aliphatic nitro compound of the type defined above. The proportions of the components in such mixtures may vary widely. Thus, satisfactory development is obtained by using mixtures containing 10 parts of nitroethane to 1 part of concentrated ammonium hydroxide, 1 part of nitromethane to 50 parts of concentrated ammonium hydroxide, 1 part of butylamine to 1 part of 1-nitropropane, 9 parts of concentrated ammonium hydroxide and 1½ parts of butylamine to 1 part of nitromethane, and 2 parts of butylamine to 1 part each of nitromethane and nitroethane. By using mixtures of different aliphatic nitro compounds as coupling components, the diazotype image can be produced in a range of colors.

Moreover, I have found that the presence of the aliphatic nitro compounds in the alkaline vapor employed for the development of conventional two-component diazotype layers does not affect the coloration of the image produced by such layers. Accordingly, the mixed vapor of an aliphatic nitro compound of my invention and a nitrogen base such as ammonia can be used to develop two-color effects when applied for the development of a diazotype material having portions sensitized with a conventional two-component composition yielding one color, and other portions sensitized with a one-component diazotype composition producing another color upon coupling with said aliphatic nitro compound.

The images produced in accordance with this invention possess good opacity to ultraviolet light and can accordingly be used to make transition copies, i. e., copies produced on translucent material which are in turn used as originals in the production of additional copies.

My invention will be more fully understood from the following examples, wherein parts are by weight unless otherwise indicated.

*Example 1*

A sheet of paper was coated with a sensitizing solution having the following composition:

4.5 parts zinc chloride double salt of p-N-methyl-N-hydroxyethyl-amino-benzene diazonium chloride
8 parts ethylene glycol
3 parts citric acid
5 parts zinc chloride
5 parts thiourea
90 parts water The paper was then dried, yielding a one-component diazotype photoprinting material. The sensitized sheet was then exposed to light in the usual manner under a line drawing serving as the original, and developed by exposure to the vapor produced by heating a mixture of 10 parts of concentrated ammonium hydroxide with 1 part of nitromethane on a steam cone. A copy of the drawing in a deep brick-red brown shade was produced, having a clear white background.

Upon substituting a similar amount of nitroethane for the nitromethane employed as described above, a yellow orange image of good light fastness was obtained.

By employing a mixture of 10 parts butylamine and 5 parts 1-nitropropane as the source of the vapors for development of a print made with paper sensitized as described above, an image having a yellow-brown shade and of good visual intensity was obtained.

Upon employing the vapors produced by heating a mixture of concentrated ammonium hyproxide, butylamine and nitromethane, for development of a print made with paper sensitized as described above, a print of exceptional line density comparable with that obtained with commercial diazotype materials was obtained.

Upon using a mixture of nitromethane, nitroethane and butylamine as the source of vapors for development of a paper described above a reddish-orange brown print was obtained.

*Example 2*

Paper sensitized with the composition of Example 1 was exposed to light under a line drawing and then developed by moistening it with an aqueous solution of ethylene diamine and nitromethane. A clear print similar in shade to that obtained by use of nitromethane vapor was obtained.

Similar results were obtained upon substituting monomethylamine, dimethylamine or morpholine for the ethylene diamine in the foregoing aqueous developing solution.

*Example 3*

Paper was coated with a sensitizing composition similar to that of Example 1 except that 5 parts of the zinc chloride double salt of p-diethylamino-benzene diazonium chloride was used in place of p-N-methyl-N-hydroxyethylamino-benzene diazonium chloride. After drying the resulting paper, and exposing it to light under an original, an image was developed by exposure thereof to the vapors obtained by heating a mixture of 5 parts of concentrated ammonium hydroxide with 5 parts of nitromethane. An image having a full brown color was obtained. The development proceeded rapidly, and the print was as dry as those obtained by using a commercial dry developing machine.

*Example 4*

Translucent paper, suitable for use in making transition copies, was sensitized as in Example 1, and exposed to light under an original. The resulting print was developed by treatment of the sensitized sheet with the vapors of a mixture of 10 parts butylamine with 5 parts nitroethane. A yellow-orange image was formed, and the resulting print was then employed as the original for making additional diazotype copies on commercial diazotype paper. Dense, readily legible copies were thereby obtained.

*Example 5*

Cellulose acetate foil was coated with a sensitizing solution having the following composition:

12 parts $ZnCl_2$ double salt of p-N-ethyl-N-hydroxyethyl-amino-o-methyl benzene diazonium chloride
15 parts isopropanol
2 parts citric acid
1.5 parts phosphoric acid
1 part zinc chloride
2 parts thiourea
5 parts acetone
45 parts water After drying, the sensitized foil was exposed to light under an original and developed by treatment with the vapors produced by heating a mixture of concentrated ammonium hydroxide and nitromethane. A readily legible bright orange-yellow image was produced. Treatment of a similarly prepared print with ammonia alone yielded only a weak image which was exceedingly difficult to read.

*Example 6*

A sensitizing solution similar to that of Example 1 except that it contained the zinc chloride double salt of p-ethylamino-m-methyl-benzene diazonium chloride instead of p-N-methyl-N-hydroxyethylamino-benzene diazonium chloride was applied to paper coated with gelatin. After drying and exposure of the sensitized sheet to light under an original, development was effected by treatment with vapors obtained by heating a mixture of nitromethane, butylamine and water. An orange image was thereby produced.

*Example 7*

A sensitizing solution was prepared having the following composition:

100 parts water
5 parts citric acid
5 parts thiourea
5 parts zinc chloride
1 part 2-nitro butanol-1
2 parts zinc chloride double salt of p-diazo-N,N-dimethylaniline The solution was coated on a sheet of paper and allowed to dry thereon. The resulting sheet was exposed to light under a suitable original, and then developed by treatment with ammonia vapor. A brownish positive image of the original was thereby obtained.

Other diazotype compounds suitable for sensitizing materials for development with aliphatic nitro compounds of this invention are, for example, the zinc chloride double salts of p-N-methyl-N-hydroxyethylamino-benzene diazonium chloride, of p-diethylamino-o-ethoxybenzene diazonium chloride, of p-ethylamino-m-methylbenzene diazonium chloride, and of 4-benzoylamino-2,5-diethoxybenzene diazonium chloride. In addition to the volatile nitro compounds of the foregoing examples, other volatile aliphatic nitro compounds, wherein the carbon atom to which the nitro group is attached carries a reactive hydrogen atom, can also be used. Similarly, non-volatile aliphatic nitro compounds of the aforesaid class can be used in two-component diazotype layers as coupling components or in the wet or semi-wet development of one-component systems. Such compounds include, for example, 1-nitro-butanol-2, nitroacetic acid methyl ester, and nitro acetamide.

Variations and modifications which will be obvious to those skilled in the art can be made in the processes and compositions of this invention without departing from the scope or nature thereof.

I claim:

1. In a process for producing diazotype prints, involving exposure of a sensitized layer comprising a light sensitive diazo compound to light in accordance with an original design to be copied, the step which comprises coupling the residual diazo compound contained in said layer with an aliphatic nitro compound wherein the carbon atom to which the nitro group is attached carries at least one active hydrogen atom.

2. In a process for producing diazotype prints, involving exposure of a sensitized layer comprising a light sensitive diazo compound to light in accordance with an original design to be copied, the step which comprises reacting the residual diazo compound, in the presence of an alkaline reacting developing medium, with an aliphatic nitro compound wherein the carbon atom to which the nitro group is attached carries at least one active hydrogen atom.

3. In a process for producing diazotype prints, involving exposure of a one-component diazotype layer containing a light sensitive diazo compound to light in accordance with an original design to be copied, the step which comprises exposing said layer to the joint action of the vapors of a volatile aliphatic nitro compound wherein the carbon atom to which the nitro group is attached carries at least one active hydrogen atom, and the vapors of a volatile non-coupling nitrogen base.

4. In a process for producing diazotype prints, involving exposure of a one-component diazotype layer containing a light sensitive diazo compound to light in accordance with an original design to be copied, the step which comprises subjecting said layer to the action of a developing solution containing an aliphatic nitro compound wherein the carbon atom to which the nitro group is attached carries at least one active hydrogen atom, and an alkaline reacting material.

5. In a process for producing diazotype prints, involving exposure of a one-component diazotype layer containing a light sensitive diazo compound to light in accordance with an original design to be copied, the step which comprises heating a mixture of a volatile aliphatic nitro compound wherein the carbon atom to which the nitro group is attached carries at least one active hydrogen atom, with a non-coupling volatile basic nitrogen compound to produce a mixture of the vapors of the aforementioned components, and exposing said layer to the resulting vapors.

6. In a process for producing diazotype prints, involving exposure of a one-component diazotype layer containing a light sensitive diazo compound to light in accordance with an original design to be copied, the step which comprises heating a mixture of a volatile nitro paraffin of one to three carbon atoms with concentrated ammonium hydroxide and exposing said layer to the resulting vapors.

7. In a process for producing diazotype prints, involving exposure of a one-component diazotype layer containing a light sensitive diazo compound to light in accordance with an original design to be copied, the step which comprises heating a mixture of a volatile nitro paraffin of one to three carbon atoms with a volatile aliphatic amine, and exposing said layer to the resulting vapors.

8. A diazotype layer comprising a light sensitive diazo compound, stabilized against coupling, and an aliphatic nitro compound wherein the carbon atom to which the nitro group is attached carries at least one active hydrogen atom.

9. A developer composition for diazotype prints essentially consisting of a volatile aliphatic nitro compound wherein the carbon atom to which the nitro group is attached contains at least one active hydrogen atom and a volatile basic nitrogen compound.

10. A developer composition for diazotype prints essentially consisting of a volatile nitroparaffin of one to three carbon atoms and a non-coupling volatile amine.

11. A developer composition for diazotype prints essentially consisting of a volatile nitroparaffin of one to three carbon atoms and ammonia.

12. A developer composition for diazotype prints essentially consisting of an aqueous solution of a volatile non-coupling nitrogen base and an aliphatic nitro compound wherein the carbon atom to which the nitro group is attached contains at least one active hydrogen atom.

FRED W. NEUMANN.

REFERENCES CITED

The following references are of record in the file of this patent:

UNITED STATES PATENTS

| Number | Name | Date |
|---|---|---|
| 1,966,755 | D'Hauterive | July 17, 1934 |
| 2,308,058 | Crowley et al. | Jan. 19, 1943 |
| 2,441,800 | Degering et al. | May 18, 1948 |